(12) United States Patent
Matsubara et al.

(10) Patent No.: US 9,732,400 B2
(45) Date of Patent: Aug. 15, 2017

(54) AUTOCLAVE APPARATUS USED DURING HIGH-PRESSURE ACID LEACHING PROCESS

(71) Applicant: SUMITOMO METAL MINING CO., LTD., Tokyo (JP)

(72) Inventors: Satoshi Matsubara, Tokyo (JP); Osamu Nakai, Tokyo (JP); Yoji Kyoda, Tokyo (JP); Takashi Sakamoto, Tokyo (JP); Haruo Ishikawa, Ehime (JP); Koichiro Maki, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 94 days.

(21) Appl. No.: 14/406,492

(22) PCT Filed: Jun. 10, 2013

(86) PCT No.: PCT/JP2013/065959
§ 371 (c)(1),
(2) Date: Dec. 8, 2014

(87) PCT Pub. No.: WO2013/191020
PCT Pub. Date: Dec. 27, 2013

(65) Prior Publication Data
US 2015/0152521 A1 Jun. 4, 2015

(30) Foreign Application Priority Data

Jun. 19, 2012 (JP) .................................. 2012-137883
Nov. 28, 2012 (JP) .................................. 2012-260294

(51) Int. Cl.
*C22B 3/00* (2006.01)
*C22B 3/02* (2006.01)
(Continued)

(52) U.S. Cl.
CPC ........ *C22B 23/043* (2013.01); *B01D 11/0234* (2013.01); *B01D 11/0257* (2013.01);
(Continued)

(58) Field of Classification Search
CPC ............ B01D 11/0234; B01D 11/0257; B01D 11/0284; B01F 13/1022; B01F 15/00863;
(Continued)

(56) References Cited

U.S. PATENT DOCUMENTS 3,121,759 A * 2/1964 Slyngstad ............ B01J 19/1862
196/46
3,961,908 A 6/1976 Touro
(Continued)

FOREIGN PATENT DOCUMENTS

EP 2 573 197 A1 3/2013
JP A-07-84623 3/1995
(Continued)

OTHER PUBLICATIONS

Jul. 2, 2013 International Search Report issued in International Application No. PCT/JP2013/065959 (with translation).
(Continued)

*Primary Examiner* — Scott Kastler
*Assistant Examiner* — Michael Aboagye
(74) *Attorney, Agent, or Firm* — Oliff PLC (57) ABSTRACT

In an autoclave apparatus for a high-pressure acid leaching process which advances leaching by stirring heated and pressurized material slurry and sulfuric acid by stirrers in compartments in an autoclave main body of a plurality of compartments, transfers slurry from an upstream side compartment to a downstream one to advance leaching, liquid flow ports for slurry transfer that open and close by doors are provided on the partition walls, the liquid flow ports for slurry transfer are installed at positions where the heights from the lowermost portion the autoclave to the center of gravity are 0.1 to 0.3 times an autoclave diameter and distances from the center lines of the partition walls to the center of gravity are 0.05 to 0.25 times the autoclave
(Continued)

diameter, and the liquid flow ports for slurry transfer have shapes which do not reach end portions of the partition walls.

3 Claims, 7 Drawing Sheets
(3 of 7 Drawing Sheet(s) Filed in Color)

(51) Int. Cl.
*C22B 3/08* (2006.01)
*B01J 19/00* (2006.01)
*B01J 19/18* (2006.01)
*C22B 3/04* (2006.01)
*B01F 7/22* (2006.01)
*B01F 13/10* (2006.01)
*B01F 15/00* (2006.01)
*B01D 11/02* (2006.01)

(52) U.S. Cl.
CPC ............ *B01D 11/0284* (2013.01); *B01F 7/22* (2013.01); *B01F 13/1022* (2013.01); *B01F 15/00863* (2013.01); *B01J 19/006* (2013.01); *B01J 19/0066* (2013.01); *B01J 19/18* (2013.01); *B01J 19/1862* (2013.01); *C22B 3/02* (2013.01); *C22B 3/04* (2013.01); *C22B 3/08* (2013.01); *B01J 2219/00768* (2013.01); *B01J 2219/182* (2013.01); *B01J 2219/1943* (2013.01); *Y02P 10/234* (2015.11)

(58) Field of Classification Search
CPC ........ B01F 7/22; B01J 19/006; B01J 19/0066; B01J 19/18; B01J 19/1862; B01J 2219/00768; B01J 2219/182; B01J 2219/1943; C22B 23/043; C22B 3/02; C22B 3/04

USPC ........... 266/186, 168; 422/187, 226; 75/711, 75/744; 366/291, 297, 137, 155.1, 155.2
See application file for complete search history.

(56) References Cited

U.S. PATENT DOCUMENTS

| | | | | |
|---|---|---|---|---|
| 5,046,856 | A | * | 9/1991 | McIntire ............... B01F 5/0603 366/137 |
| 6,299,776 | B1 | | 10/2001 | McWhirter et al. |
| 6,835,230 | B2 | * | 12/2004 | Kanno ..................... C22B 3/08 241/20 |
| 7,604,783 | B2 | * | 10/2009 | King ........................ C22B 3/08 423/29 |
| 8,061,888 | B2 | * | 11/2011 | Ji ......................... B01F 7/00975 366/155.1 |
| 2007/0217285 | A1 | * | 9/2007 | Ji ......................... B01F 7/00975 366/291 |

FOREIGN PATENT DOCUMENTS

| | | |
|---|---|---|
| JP | A-2003-82420 | 3/2003 |
| JP | A-2005-350766 | 12/2005 |
| JP | A-2009-515044 | 4/2009 |
| JP | A-2009-530077 | 8/2009 |
| JP | A-2011-241446 | 12/2011 |

OTHER PUBLICATIONS

Jan. 29, 2016 Extended Search Report issued in European Patent Application No. 13807230.1.

* cited by examiner

AUTOCLAVE APPARATUS USED DURING HIGH-PRESSURE ACID LEACHING PROCESS

FIELD OF THE INVENTION

The present invention relates to an autoclave apparatus through which sulfide material continuously passes during a high-pressure acid leaching process of nickel oxide ore. More specifically, the present invention relates to a technique where in an autoclave used for high-pressure acid leaching of nickel oxide ore, when such an operation is performed that the autoclave is partitioned into a plurality of compartments by partition walls and leaching is performed while charged material is sequentially transferred to the respective compartments, a leaching rate can be maintained in the same level as one of the previous one by regulating positions of liquid flow ports provided on the partition walls even if a free sulfuric acid amount which is a management value for autoclave finish-solution is reduced. The present application asserts priority rights based on JP Patent Application 2012-137883 filed in Japan on Jun. 19, 2012 and JP Patent Application 2012-260294 filed in Japan on Nov. 28, 2012. The total contents of disclosure of the patent application of the senior filing date are to be incorporated by reference into the present application.

BACKGROUND OF THE INVENTION

In recent years, due to that a material having corrosion resistance effective under a high temperature and a high pressure has been developed, attention is paid to a high-pressure acid leach (HPAL) as a hydrometallurgical process of nickel oxide ore. The HPAL is different from a pyrometallurgical process which is a conventional and common metallurgical process of nickel oxide ore and has such a merit that it is advantageous regarding energy and cost since it does not include a dry process such as a reducing and drying process and is composed of a consistent wet process. That is, in the above-described HPAL, by controlling oxidation-reduction potential and a temperature of leachate in a pressurizing and leaching reactor through a leaching process, iron of major impurity is fixed to leached residue in a form of hematite ($Fe_2O_3$), nickel and cobalt can be leached selectively to iron, which results in a large merit.

For example, as the hydrometallurgical process of nickel oxide ore, a high-pressure acid leaching process utilizing an autoclave is adopted.

Figure 7:
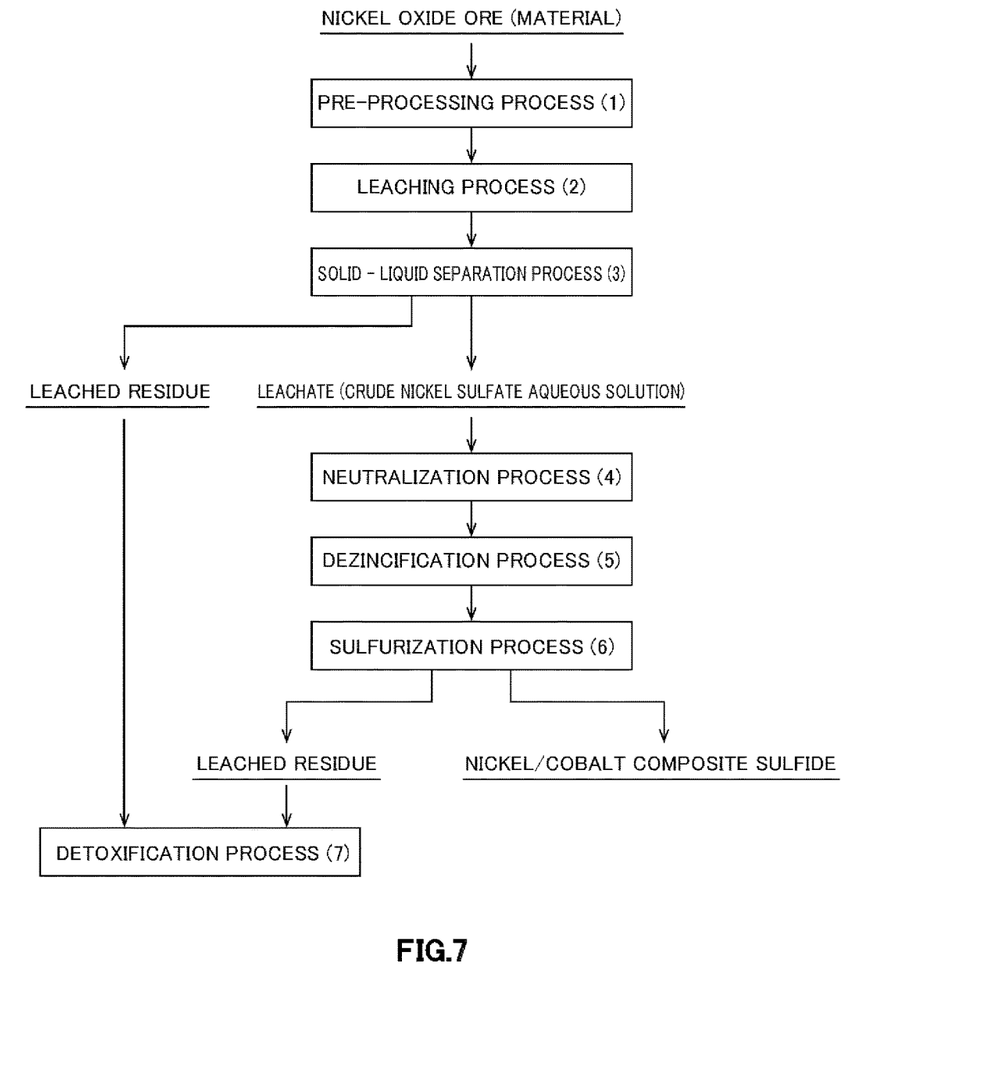
FIG. 7 is a process view showing a leaching procedure of nickel and cobalt according to a high-pressure acid leaching process of nickel oxide ore.

In a high-pressure acid leaching process for obtaining nickel/cobalt mixed sulfide, for example, as shown in FIG. 7, a pre-processing process (1), a high-pressure acid leaching process (2), a solid-liquid separating process (3), a neutralization process (4), a dezincification process (5), a sulfurization process (6), and a detoxification process (7) are included (see PTL 1, for example).

In the pre-processing process (1), material slurry with a predetermined slurry concentration including ores of 2 mm or less is prepared by cracking and classifying nickel oxide ore using crushing equipment and sieving equipment. The material slurry is supplied to the next high-pressure acid leaching process (2).

In the high-pressure acid leaching process (2), after the material slurry obtained in the pre-processing process (1) is raised in temperature and pressure in a stepwise manner in a preheater (temperature-raising and pressure-raising equipment), it is supplied to an autoclave, and sulfuric acid similarly raised in temperature and pressure is added to the material slurry in the autoclave, with stirring is performed at a temperature of 220 to 280 degrees C., valuable metals are acid-leached with high-pressure and high-temperature, and leached slurry to be obtained is lowered in temperature and pressure down to the ordinary temperature and the normal pressure in a flash vessel.

In the solid-liquid separation process (3), the leached slurry of valuable metals obtained in the leaching process (2) is separated into solid component and liquid component, and leachate (crude nickel sulfate aqueous solution) containing nickel and cobalt as the valuable metals and leached residue are obtained.

In the neutralization process (4), the leachate obtained in the solid-liquid separating process (3) is neutralized.

In the dezincification process (5), zinc is precipitated and removed as zinc sulfide by adding hydrogen sulfide gas to the leachate neutralized in the neutralization process (4).

In the sulfurization process (6), nickel/cobalt composite sulfide and nickel barren solution are obtained by adding hydrogen sulfide gas to the dezinced post-solution obtained in the dezincification process (5).

In the detoxification process (7), the leached residue generated in the solid-liquid separating process (3) and the nickel barren solution generated in the sulfurization process (6) are detoxified.

Here, in the autoclave used the high-pressure acid leaching process (2), the heated and pressurized material slurry and sulfuric acid are supplied to a first compartment partitioned into a plurality by partition walls in the autoclave, leaching is advanced while stirring is being performed by a stirrer provided in the first compartment, the slurry is transferred to a second compartment and compartments subsequent thereto through overflow or the like, so that leaching is further advanced in a similar manner.

Now, when the slurry is transferred to the next compartment within the autoclave, there is a case where the transfer is performed through a liquid flow port provided at a lower portion of the partition wall in addition to the case where the transfer is performed by overflowing an upper portion of the partition wall (see PTL2, for example).

The slurry to be overflowed and the slurry on a bottom portion of each compartment are generally different in staying time in the compartment from each other, though depending on a situation of slurry fluidity in the compartment obtained by stirring. Therefore, by transferring the overflowed slurry and the slurry on the bottom portion with good balance to the next compartment, long and short of the staying time can be balanced so that efficient operation is intended by averaging all of the staying times.

Further, as a roll of the liquid flow port not in a steady operation but when the operation is emergently stopped due to any trouble, there is such a matter that it is made possible to supply slurries in the respective compartments to a final-stage compartment in order to continue slurry discharge from the autoclave as long as possible.

The amount of discharge slurry from the autoclave is controlled by a valve provided between the autoclave and the flash vessel such that a set liquid level of the autoclave is maintained. When the slurry supply to the autoclave is stopped due to any trouble, it is necessary to close a discharge valve in order to maintain the liquid level of the autoclave, but once the discharge valve is closed fully, for opening the discharge valve again, it is necessary to lower the temperature and the pressure of the inside of the autoclave largely as compared with those in a normal operation in order to prevent equipment damage due to urgent evaporation in a discharge pipe and the flash tank.

When such a work has been performed, a long period of time is required to return the ordinary operation, which results in a large loss of an operating time. Therefore, even if the operation is emergently stopped, the slurry in the autoclave continues to be discharged at an extremely slight flow rate without fully closing the discharge valve. Liquid flow ports are provided so as to make it possible to supply slurries in the respective compartments to the final compartment through the liquid flow ports to continue to maintain the slurry discharge as long as possible at this time.

Therefore, it is an important point for designing that the sizes of the liquid flow ports are made as small as possible in the steady operation in order to maintain an overflow state for transferring the slurry through overflow and the slurry on the bottom portion to the next compartment with good balance, and the sizes of the liquid flow ports are made as large as possible for an emergency stopping time, and the sizes are properly adjusted and set according to the flow rate in a real operation or the size of the autoclave.

However, there is such a case that the balance is collapsed and slurry transfer from the liquid flow ports provided on the lower portions of the partition walls becomes dominant, so that slurry transfer through the overflow is almost gone, and such a problem arises that efficient operation is obstructed because the staying time of slurry is biased to the slurry on the bottom portion.

Since the problem causes such an effect that the overall leaching rate of the autoclave lowers, so that an excessive amount of sulfuric acid as compared with an amount equivalent to valuable metals contained in the material slurry is charged into the autoclave in order to maintain a predetermined leaching rate (ordinarily, 90 to 95%) on the operation. In order to maintain the operation, management is performed based upon the amount of free sulfuric acid (unreacted sulfuric acid remaining in the above-described leachate), and the value of the amount is ordinarily 50 to 55 g/L or so.

Further, since the leachate obtained in the solid-liquid separating process (3) is neutralized in the next neutralization process (4), the free sulfuric acid is neutralized without contributing to leaching, which is wasteful. Further, since a cost of a neutralizer for neutralization is required, there is such a problem that it is desired to reduce the amount of the free sulfuric acid as much as possible, but the current state lies in such a situation that the above-described amount of free sulfuric acid must be kept in order to maintain the predetermined leaching rate.

For example, such a technique is proposed that an optimal temperature condition is maintained without performing external heating or cooling by such an idea as maintaining the volume of reactive slurry in the first compartment within the autoclave larger than the volume of the reactive slurry in any of the downstream side compartments by 50 to 200% (see PTL 3, for example).

Further, a technique is proposed to reproduce sulfuric acid according to a composite implementation composed of two or more continuous leaching stages including a stage of leaching at the normal pressure and a stage of pressurized leaching and reduce the amount of sulfuric acid by an amount equal to the amount of added sulfuric acid (see PTL4, for example).

However, since the disclosed technique in the above-described PTL 3 targets sulfide material and the disclosed technique in the above-described PTL 4 requires the process of leaching at the normal pressure, these techniques cannot be applied to the above-described problem.

Further, in the autoclave apparatus having compartments partitioned into a plurality by the partition walls, openings for a manway used when a worker inspects inside of the autoclave in such a time as a periodical inspection are provided on respective partition walls and the above-described openings for a manway are closed.

In view of the strength of the partition wall, the liquid flow port for slurry transfer is provided in a door member for a manway together with a door of the liquid flow port for slurry transfer, and the autoclave apparatus is used during an ordinary operation in a state where the door for a manway has been closed and the door of the liquid flow port for slurry transfer has been opened.

The manway is used when the worker inspects inside of the autoclave in such a time as a periodical inspection, and since the inclination of a central bottom portion is the smallest inside of the autoclave as a foothold, the door for a manway is provided in the vicinity of the central bottom portion of the partition wall. Therefore, it is popular that the door of the liquid flow port for slurry transfer is also provided in the central bottom portion of the partition wall.

PRIOR-ART DOCUMENTS

Patent Document

PTL 1: Japanese Patent Application Laid-Open No. 2005-350766
PTL 2: Japanese Patent Application Laid-Open No. 2003-82420
PTL 3: Japanese Examined Patent Application Publication No. H07-084623
PTL 4: Japanese Unexamined Patent Application Publication No. 2009-515044

SUMMARY OF THE INVENTION

In view of the above-described conventional problems, an object of the present invention is to provide an autoclave apparatus which facilitates effective operation in a high-pressure acid leaching process and can reduce a management value of a free sulfuric acid concentration after discharged.

Further, another object of the present invention is to provide an autoclave apparatus which has a liquid flow port for slurry transfer which can function as a manway in a partition wall while securing an overflow during a high-pressure acid leaching process.

Still another object of the present invention and specific advantages obtained by the present invention will become apparent from description of embodiments described below.

In order to achieve the above objects, the present inventors have found an effective installation positions of liquid flow ports for slurry transfer to be provided on a partition wall of an autoclave by examining flow velocities (stirring pressures) of slurry in respective compartments due to stirring and have completed an autoclave apparatus which can facilitate effective operation by averaging staying times to reduce a management value of a free sulfuric acid concentration after discharged.

That is, the present invention is an autoclave apparatus used during a high-pressure acid leaching process which advances leaching by stirring heated and pressurized material slurry and sulfuric acid by stirrers provided in respective compartments partitioned into a plurality by partition walls in an autoclave, and transfers slurry from an upstream side compartment to a downstream side compartment to sequentially advance leaching, wherein liquid flow ports for slurry transfer which can be opened and closed freely by doors of the liquid flow port for slurry transfer, respectively, are provided in the respective partition walls, and the liquid flow ports for slurry transfer are installed at positions where the heights from the lowermost portion of the autoclave to the center of gravity of the liquid flow port doors for slurry transfer are 0.1 times to 0.3 times an autoclave diameter and distances from the center lines of the partition walls to the center of gravity of the liquid flow port doors for slurry transfer are 0.05 times to 0.25 times the autoclave diameter, and the liquid flow ports for slurry transfer have shapes which do not reach end portions of the partition walls.

In the autoclave apparatus according to the present invention, such a configuration can be adopted that the above-described liquid flow ports for slurry transfer are provided in the above-described respective partition walls at positions on the downstream side in a stirring direction of the slurry caused by the stirrer in the upstream side compartment.

In the autoclave apparatus according to the present invention, such a configuration can be adopted that the above-described liquid flow ports for slurry transfer are rectangular openings which do not reach end portions of the partition walls.

Further, in the autoclave apparatus according to the present invention, such a configuration can be adopted that the above-described liquid flow ports for slurry transfer are installed on doors of openings for a manway.

Further, in the autoclave apparatus according to the present invention, such a configuration can be adopted that the above-described liquid flow ports for slurry transfer are rectangular openings with 30 cm square to 50 cm square.

Further, in the autoclave apparatus according to the present invention, such a configuration can be adopted that notch portions which can adjust an overflow amount freely according to an installation height position of an adjustment plate are formed on upper end portions of the above-described partition walls.

Further, in the autoclave apparatus according to the present invention, such a configuration can be adopted that operation is performed at a flow rate of 500 m$^3$/h in a state where regarding a downstream partition wall of the partition walls, a ratio of a liquid volume passing through the notch portion thereof and a liquid volume passing through the liquid flow port for slurry transfer thereof is set to 55:45, while regarding other partition wall, the ratio of a liquid volume passing through the notch portion thereof and a liquid volume passing through the liquid flow port for slurry transfer thereof is set to 84:16.

Effects of Invention

According to the present invention, mixing of material slurry and sulfuric acid can be facilitated to reduce a management value of a free sulfuric acid concentration after discharged during a high-pressure acid leaching process.

BRIEF DESCRIPTION OF DRAWINGS

The patent or application file contains at least one drawing executed in color. Copies of this patent or patent application publication with color drawings will be provided by the Office upon request and payment of the necessary fee.

FIG. 1 is a view showing a main section configuration example of an autoclave apparatus to which the present invention is applied, FIG. 1A being a cross-sectional plan view schematically showing an internal structure obtained by cutting the autoclave apparatus horizontally and FIG. 1B being a vertical-sectional side view schematically showing an internal structure by cutting the autoclave apparatus vertically along a line B-B shown in FIG. 2;

DETAILED DESCRIPTION OF THE INVENTION

Embodiments of the present invention will be described in detail below with reference to the drawings.

Figure 1A:
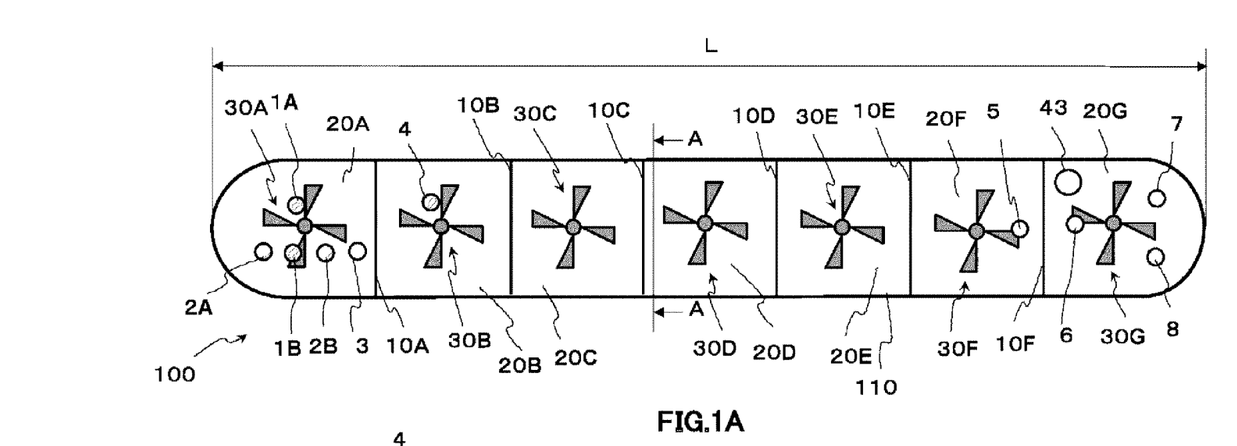
Figure 1B:
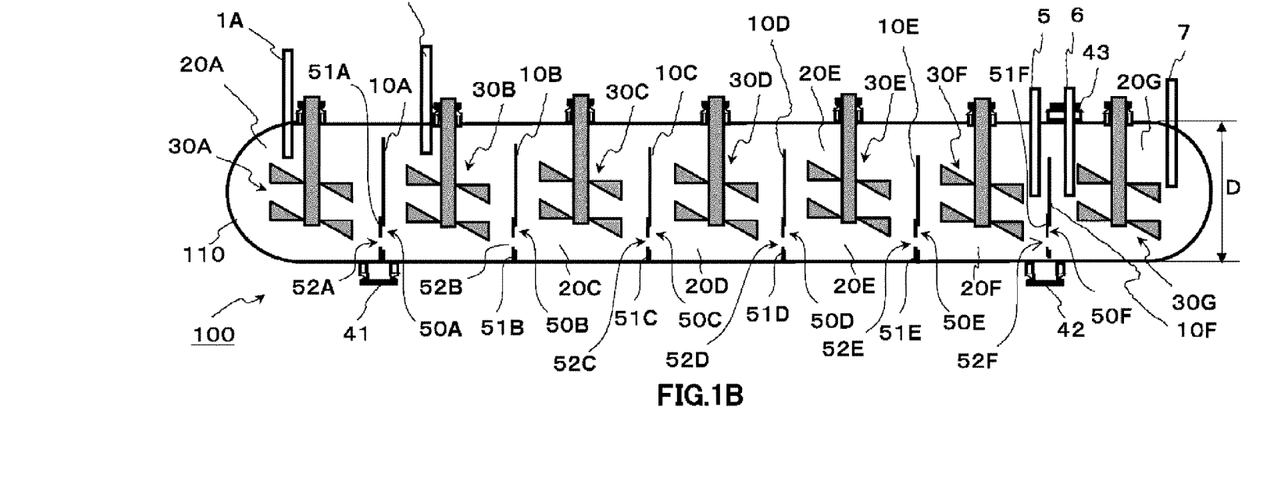
Figure 2:
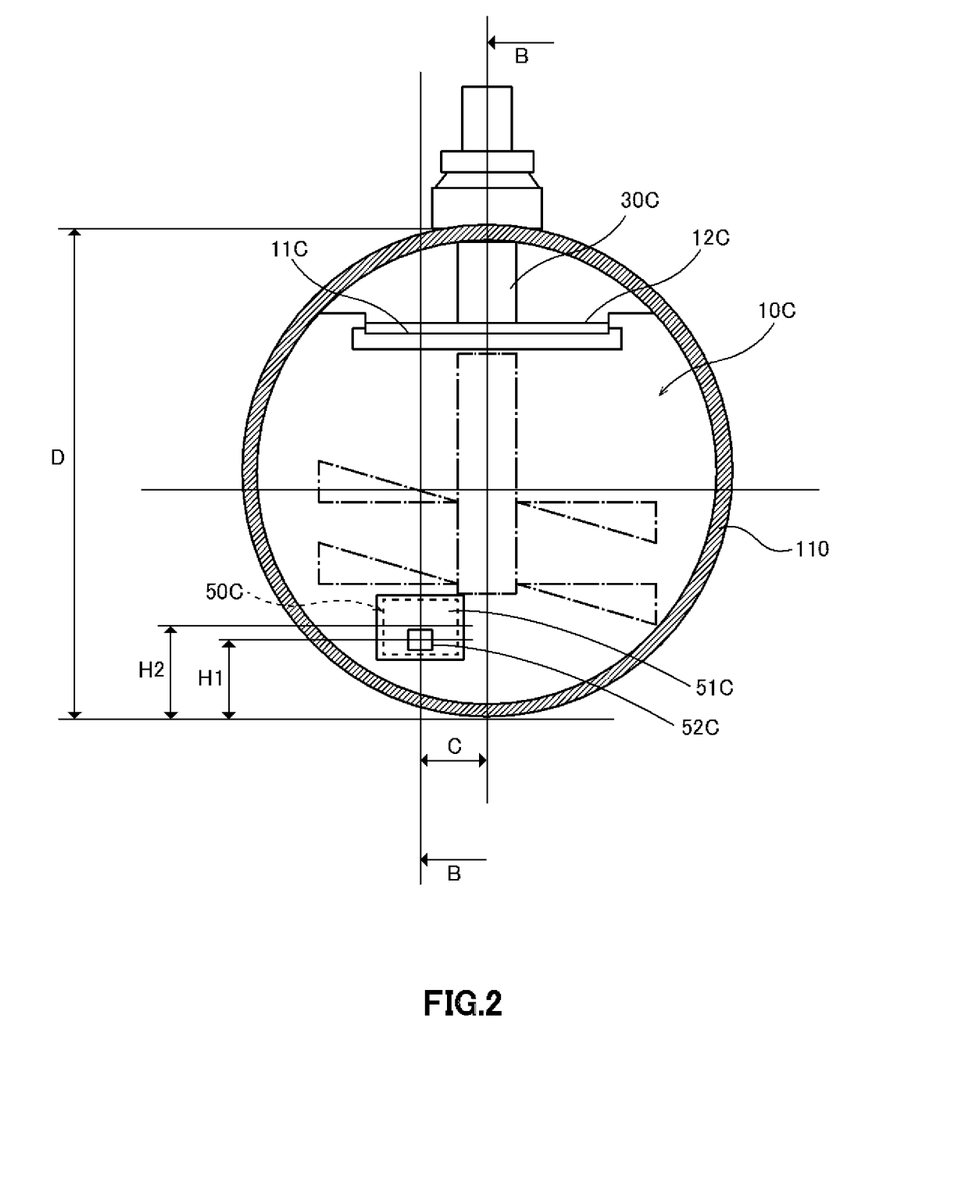
FIG. 2 is a vertical-sectional front view schematically showing an internal structure by cutting the autoclave apparatus vertically along a line A-A shown in FIG. 1A.

The present invention is implemented by an autoclave apparatus 100 having such a structure as shown in FIG. 1 and FIG. 2, for example.

FIG. 1 is a view showing a main section configuration example of the autoclave apparatus 100, FIG. 1A being a cross-sectional plan view schematically showing an internal structure by cutting the autoclave apparatus 100 horizontally, and FIG. 1B being a vertical-sectional side view schematically showing an internal structure by cutting the autoclave apparatus 100 vertically along a line B-B shown in FIG. 2. Further, FIG. 2 is a vertical-sectional front view schematically showing an internal structure by cutting the autoclave apparatus 100 vertically along a line A-A shown in FIG. 1A.

The autoclave apparatus 100 is an autoclave apparatus used during a high-pressure acid leaching process for stirring heated and pressurized material slurry and sulfuric acid to perform high-temperature and high-pressure acid leaching of valuable metal, which is provided with a plurality of compartments 20A, 20B . . . 20G obtained by partitioning inside of a cylindrical autoclave main body 110 installed horizontally by partition walls 10A, 10B . . . 10F, where stirrers 30A, 30B . . . 30G are installed in the respective compartments 20A, 20B . . . 20G. In the autoclave apparatus 100, leaching is advanced by stirring the material slurry and sulfuric acid by the stirrers 30A, 30B . . . 30G provided in the respective compartments 20A, 20B . . . 20G of the plurality of compartments obtained by performing partitioning by the above-described partition walls 10A, 10B . . . 10F, and the slurry is transferred to a compartment on an upstream side to a compartment on a downstream side to sequentially advance leaching.

In the autoclave main body 110, two material slurry supply pipes 1A and 1B having material slurry discharge ports, respectively, and two sulfuric acid supply pipes 2A and 2B having sulfuric acid discharge ports, respectively are alternately arranged around a stirring blade of the stirrer 30A provided in the compartment 20A on the uppermost stream end. The above-described material slurry discharge ports and sulfuric acid discharge ports are located at positions higher than the uppermost portion of the stirring blade and lower than a content liquid level L. Further, in the compartment 20A, a high-pressure steam supply pipe 3 having a high-pressure steam discharge port is provided in the vicinity of the partition wall 10A. A sulfuric acid supply pipe 4 having a sulfuric acid discharge port is provided in the vicinity of a stirring blade of the stirrer 30B provided in the next compartment 20B.

Further, a pipe 5 for PSV vent having a suction port is provided in the vicinity of a stirring blade of the stirrer 30F provided in the compartment 20F on the downstream end side.

In addition, a pipe 6 for TAIL gas vent having a suction port, a pipe 7 for slurry extraction having a slurry extraction port and a spare pipe 8 are provided in the vicinity of a stirring blade of the stirrer 30G provided in the compartment 20G on the most downstream end.

It should be noted that the respective pipes are inserted into insides of the compartments from above the autoclave main body 110.

Further, in the autoclave apparatus 100, the respective stirrers 30A, 30B . . . 30G provided in the respective compartments 20A, 20B . . . 20G are rotated in a clockwise direction, respectively, to form downward flows of slurry.

Further, in the compartment 20A on the most upstream end of the autoclave apparatus 100, a manhole 41 closed by an opening and closing lid is provided in a floor wall portion in the vicinity of the partition wall 10A. Further, in the compartment 20F on the downstream end side, a manhole 42 closed by an opening and closing lid is provided in a floor wall portion in the vicinity of the partition wall 10F. In addition, in the compartment 20G on the most downstream end, a manhole 43 closed by an opening and closing lid is provided in a ceiling portion in the vicinity of the partition wall 10F.

Here, the autoclave main body 110 in the autoclave apparatus 100 has a shape obtained by closing both end portions of a cylinder having a diameter D of about 5500 mm and an entire length L of about 35000 mm by semispherical faces, and has a capacity of about 1000 m$^3$.

In the autoclave main body 110, openings for a manway 50A, 50B . . . 50F used when a worker inspects inside of the autoclave at such a time as a periodical inspection are provided on the respective partition walls 10A, 10B . . . 10F, and liquid flow ports for slurry transfer 52A, 52B . . . 52F are provided on doors 51A, 51B . . . 51F closing the above-described openings for a manway 50A, 50B . . . 50F.

The above-described liquid flow ports for slurry transfer 52A, 52B . . . 52F are configured so as to be opened and closed by opening and closing lids (not shown), respectively, and the autoclave apparatus is used in the usual operation in a state where the openings for a manway 50A, 50B . . . 50F have been closed by the doors 51A, 51B . . . 51F and the doors of the liquid flow ports for slurry transfer 52A, 52B . . . 52F have been opened.

Here, the liquid flow ports for slurry transfer 52A, 52B . . . 52F provided on the respective partition walls 10A, 10B . . . 10F within the autoclave main body 110 are formed to have shapes with sizes allowing about 10% to 45% of a full flow, which do not reach end portions of the partition walls. The liquid flow ports for slurry transfer 52A, 52B . . . 52F in the autoclave apparatus 100 are formed in a rectangular shape with a height of 170 mm and a width of 240 mm having a position spaced from the center line of the autoclave main body 110 by a distance C=600 mm and spaced from a bottom face by a distance H1=785 mm as the center of gravity, as the partition wall 10C, shown in the vertical-sectional front view of FIG. 2, representing the respective partition walls 10A, 10B . . . 10F.

Further, the openings for a manway 50A, 50B . . . 50F are arranged as close to the centers as possible in ranges where interferences with pipes inserted into the respective compartments 20A, 20B . . . 20G do not occur, and are formed in rectangular shapes with a height H of 580 mm and a width W of 600 mm having a position spaced from the center line of the autoclave main body 110 by a distance C=600 mm and spaced from the bottom face by a distance H2=890 mm as the center of gravity.

Figure 3:
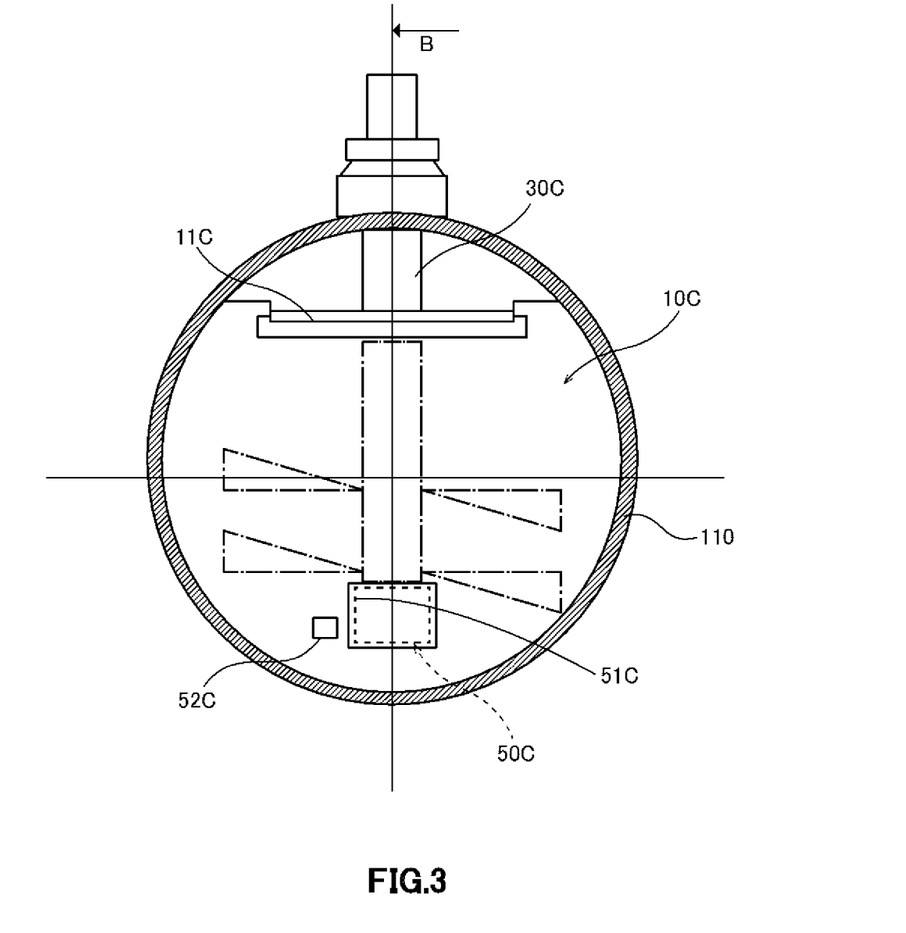
FIG. 3 is a vertical-sectional front view schematically showing another installation example of an opening for a manway and a liquid flow port for slurry transfer.

It should be noted that such a configuration may be adopted that the openings for a manway 50A, 50B . . . 50F are installed at the centers and only the liquid flow ports for slurry transfer 52A, 52B . . . 52F are arranged deviating from the center line of the autoclave main body 110, as shown in FIG. 3.

Further, notch portions 12C which can adjust an overflow amount freely according to an installation height position of an adjusting sheathing board 11C are provided in upper end portions of the partition walls 10A, 10B . . . 10F in the autoclave main body 110 like the partition wall 10C shown in the vertical-sectional front view of FIG. 2.

Figure 4:
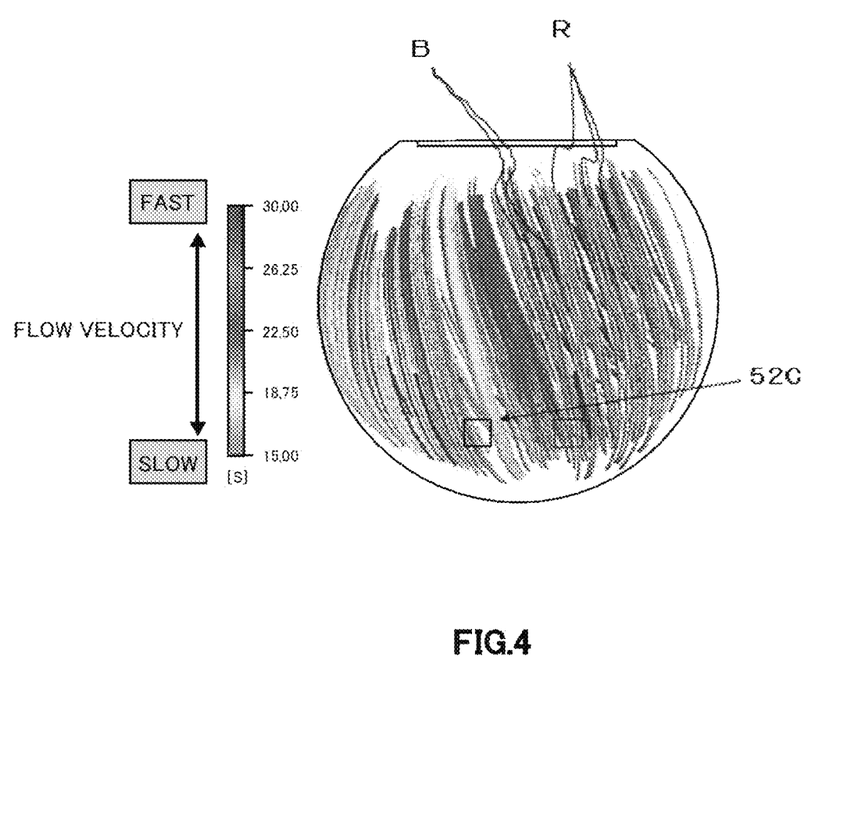
FIG. 4 is a simulation result of indoor convection in the above-described autoclave apparatus.

In the autoclave apparatus 100, there are deviations in flows of slurry in the respective compartments 20A, 20B . . . 20G caused by clockwise rotations of the respective stirrers 30A, 30B . . . 30G, as a simulation result of convection within the autoclave compartment is shown in a schematic view of FIG. 4, and the convection speed is fast in the right direction of the figure regardless of the positions of the openings for slurry transfer. FIG. 4 shows slurry flow lines in the vicinity of a partition wall, and shows such a fact that slurry having a short staying time indicated by red lines R is more in presence than slurry having a short staying time indicated by blue lines B.

In the autoclave apparatus 100, since the above-described liquid flow ports for slurry transfer 52A, 52B . . . 52F are provided at positions displaced to the downstream sides of flows of slurry in the respective compartments 20A, 20B . . . 20G occurring due to clockwise rotations of the respective stirrers 30A, 30B . . . 30G and spaced from the center line of the autoclave main body 110, pressures to the partition walls generated due to flows of slurry act on positions lower than the conventional case, and transfers of slurry from the liquid flow ports for slurry transfer 52A, 52B . . . 52F do not become dominant so that balance with transfers through overflows can be kept.

Therefore, in the conventional art, unless the free sulfuric acid concentration in the leachate is set in a range from 50 to 55 g/L, a range from 90 to 95% which is a predetermined leaching rate cannot be maintained, but even if the free sulfuric acid concentration in the leachate is set in a half such as a range from 45 to 50 g/L, the predetermined leaching rate can be maintained in the autoclave apparatus 100.

Here, though it can be thought that transfer amounts from the liquid flow ports for slurry transfer 52A, 52B . . . 52F are controlled by making opening areas of the liquid flow ports for slurry transfer 52A, 52B . . . 52F small without changing the positions of the liquid flow ports for slurry transfer 52A, 52B . . . 52F, the above-described balance could not be maintained since an effect was small even if the openings of the liquid flow ports were made small. It is thought since the slurry is a target for operation of nickel oxide ore, pressure imparted to a central portion exceeds a range where the pressure can be controlled by adjusting the area of the opening when stirring required for leaching is performed.

If the positions of the liquid flow ports for slurry transfer 52A, 52B . . . 52F are moved from the centers like the autoclave apparatus 100, a controllable low pressure is obtained, so that the opening areas can be properly adjusted according to the slurry amount to be transferred to the next compartment, namely, a ratio of the overflow amount of slurry and the slurry amount passing through the liquid flow port for slurry transfer.

In the autoclave apparatus 100, the overflow amounts can be adjusted according to the installation height positions of adjusting sheathing boards in notch portion 12A, 12B . . . 12F provided at upper end portions of the respective partition walls 10A, 10B . . . 10F, while the opening areas of the liquid flow ports for slurry transfer 52A, 52B . . . 52F are fixed.

Figure 5:
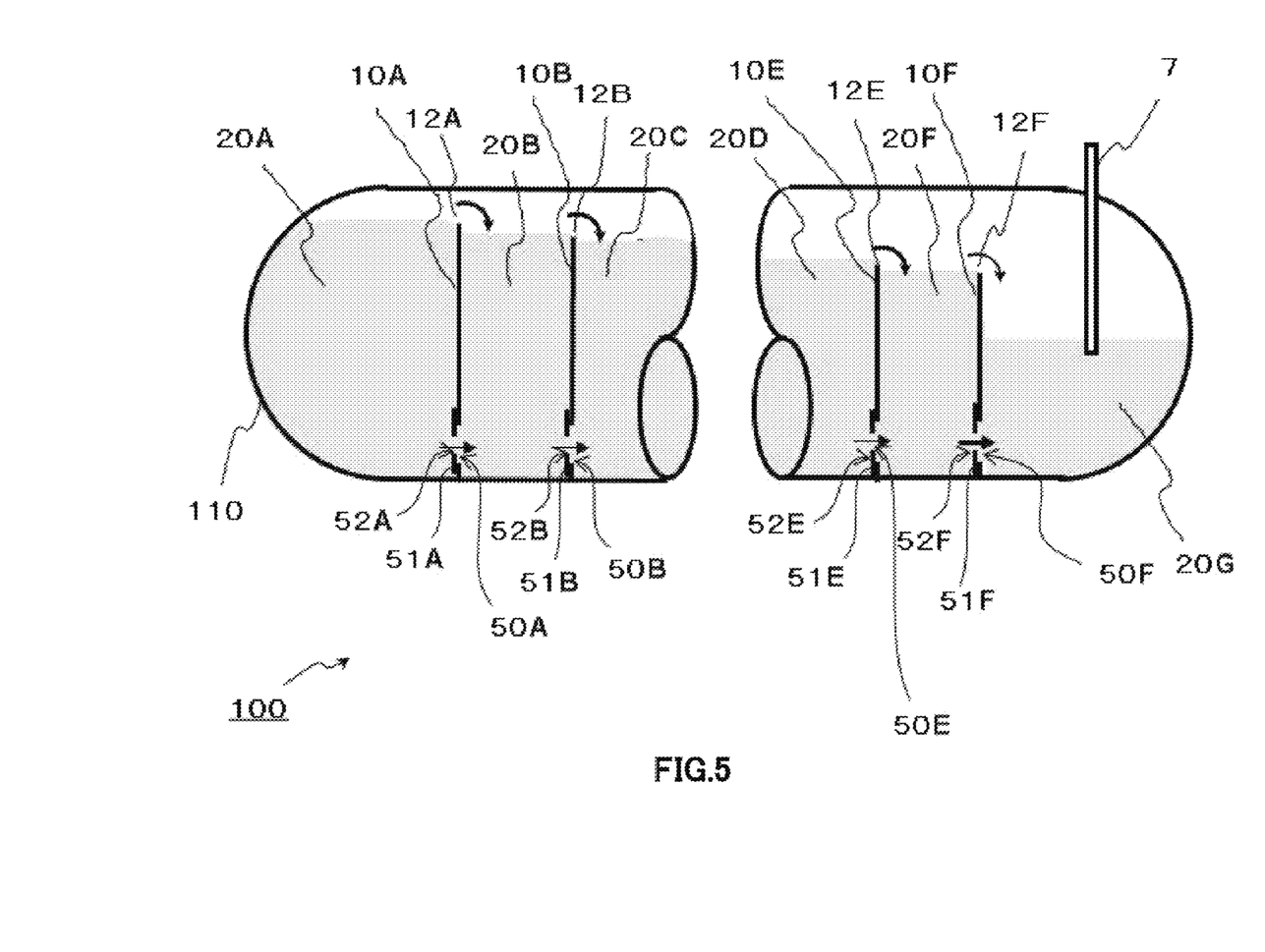
FIG. 5 is a view schematically showing a transfer state of slurry in the above-described autoclave apparatus.

In the autoclave apparatus 100, as shown in FIG. 5, when an operation was performed at a flow rate of 500 m$^3$/h in a state where the partition wall 10F on the downstream side was set such that a ratio of the overflow volume of slurry passing through the notch portion 12F and the slurry volume passing through the liquid flow port for slurry transfer 52F was 55:45, while the other partition walls 10A, 10B . . . 10E were set such that a ratio of the overflow volumes of slurries passing through the notch portions 12A, 12B . . . 12E and the slurry volumes passing through the liquid flow ports for slurry transfer 52A, 52B . . . 52E was 84:16, the overflow amount was securely maintained, and the staying time of slurry was increased as compared with the conventional art by 20%, so that management and operation could be performed in a state where a necessary free sulfuric acid concentration was reduced to about 45 g/L.

It should be noted that if the liquid flow ports for slurry transfer 52A, 52B . . . 52F are installed on the side where the discharge ports of steam pipes are present, the temperatures are raised higher than that of the surrounding areas by steams and slurries for preventing temperature drops in the respective compartments are transferred to the next compartments, which is undesirable.

Further, the liquid flow ports for slurry transfer 52A, 52B . . . 52F are not particularly limited regarding their shapes except that they have the above-described adjusted area, but it is preferable that the liquid flow ports for slurry transfer 52A, 52B . . . 52F have shapes which do not reach partition wall end portions. Reaching the partition wall end portions, namely, the end portions of partition wall main bodies being firmly fixed to an autoclave wall face can prevent lowering of fixing strengths of the partition walls.

Figure 6:
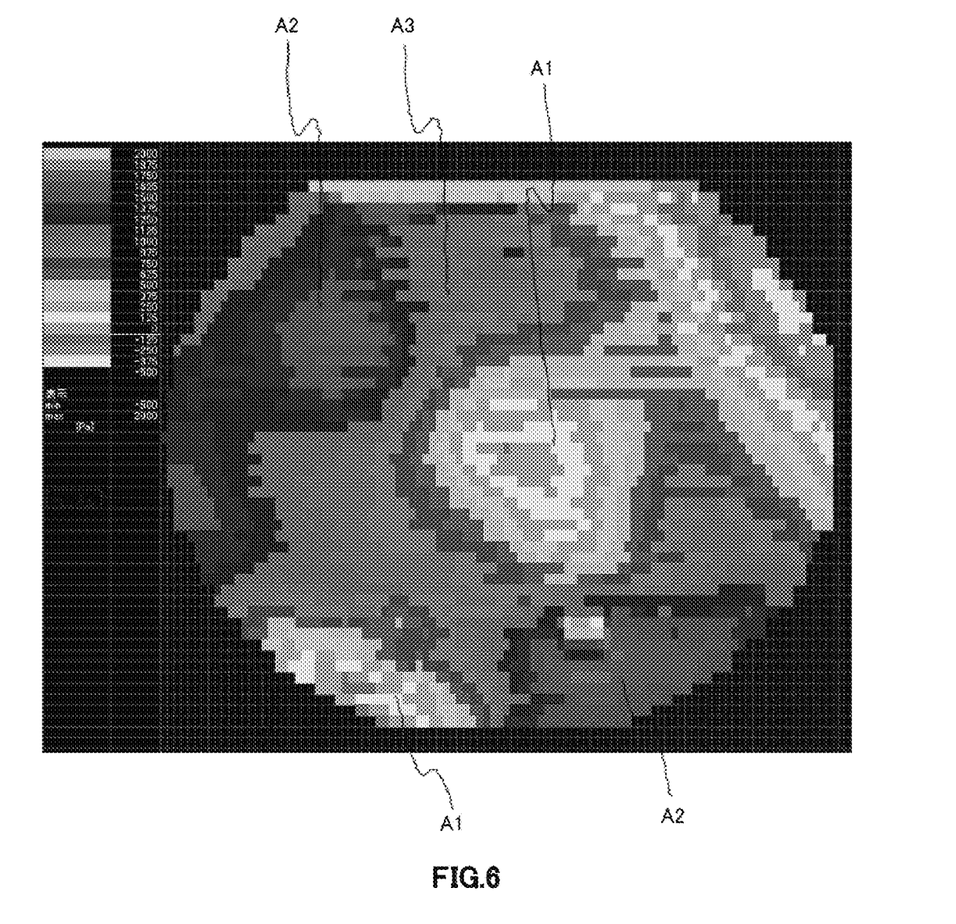
FIG. 6 is a schematic view showing a result of simulation of distribution of pressure difference between vessels (first vessel–second vessel) in the above-described autoclave apparatus.

Here, in a two-vessel model where a first vessel and a second vessel have been connected to each other via a partition wall having a diameter of 6 m, a result obtained by performing fluid analysis when a liquid flow port for slurry transfer is provided on a partition wall so as to be positioned on the downstream side of a direction of stirring of slurry performed by a stirrer in the first vessel on the upstream side and simulating a distribution of a pressure difference between the vessels (the first vessel and the second vessel) is shown in a schematic view of FIG. 6. In FIG. 6, a region A1 from yellow to red indicates a place where a pressure on the first vessel side is high and shows such a tendency that flow from the first vessel to the second vessel easily occurs. On the other hand, a region A2 from aqua blue to brown/blue is a region where a pressure difference is reduced, where flow from the first vessel to the second vessel is hard to occur. Further, a region from gray to black indicates a place where the pressure difference is reversed, and a region A3 of rufescent pink indicates a place where the pressure difference is zero, namely is a balanced region. From this figure, a nearby region of the calculated position of the opening for the above-described slurry transfer is a distribution region A1 whose color is yellow (namely, a pressure difference of about 1400 Pa at most), which is a region where flow from the first vessel to the second vessel occurs easily.

When the liquid flow port for slurry transfer is translated from the above-described position to an upstream side of the stirring direction of slurry, the pressure difference at this place is about 600 Pa at most, which is a half value as compared with a value at the initial position. Since the velocity is proportional to the square root of the pressure difference ($P=\rho u^2/2$), the pressure becomes ½, which means that when the liquid flow port for slurry transfer having the same size is installed on the upstream side in the stirring direction of slurry, the flow rate is $(½)^{0.5}$, namely is reduced to 70%, which results in difficulty in flowing into the second vessel.

From this result, in order to install a liquid flow port for slurry transfer having as a large size as possible while maintaining the overflow, it has been found that the liquid flow port for slurry transfer should be installed to be displaced to the downstream side in the rotating direction of the stirring blade rather than the upstream side thereof.

From FIG. 6, a region where the pressure difference is small ranges in a place positioned at the height of 100±20 cm from the lowermost portion and spaced from the center of the partition wall by 50 cm, and it is desirable that the liquid flow port for slurry transfer is installed at this place.

Therefore, the above-described liquid flow ports for slurry transfer 52A, 52B . . . 52F were installed at positions where the heights from the lowermost portion of the autoclave to the center of gravities of doors of the liquid flow ports for slurry transfer were 0.1 to 0.3 times or less the autoclave diameter D and distances from the center lines of the partition walls to the center of gravities of doors of the liquid flow ports for slurry transfer were 0.05 to 0.25 times the autoclave diameter D and had shapes which did not reach end portions of the partition walls. At this time, a direction displaced from the center is a left direction when the compartment on the downstream side faces the partition wall if the rotating direction of the stirrer is a right rotation. If the stirrer is rotated in a left direction, the direction displaced from the center is reversed thereto. At this time, the rotating directions of the stirrers in the respective compartments are set to be the same direction. That is, the above-described liquid flow ports for slurry transfer are provided on the respective partition walls at positions on the downstream sides of the stirring directions of slurry of the stirrers in the compartments on the upstream sides.

Further, the shapes of the liquid flow ports for slurry transfer 52A, 52B . . . 52F are not limited particularly, but by adopting a rectangular shape, working is made easy, which is desirable.

Further, when the liquid flow port for slurry transfer is disposed in a region where the pressure difference is small, even if a large shape thereof is adopted, the overflow can be secured, so that by adopting a rectangular opening with a 30 cm square to 50 cm square, the liquid port for slurry transfer functions as a manway while securing the overflow.

Further, in the autoclave apparatus 100, since the liquid flow ports for slurry transfer 52A, 52B . . . 52F are installed on the doors 51A, 51B . . . 51F closing the openings for a manway 50A, 50B . . . 50F, opening portions are collected in one portion as the whole partition wall, so that the strength of the partition wall can be prevented from lowering. In this case, since the openings for a manway 50A, 50B . . . 50F are moved to both sides from the center portions, the inclination of the autoclave becomes relatively large, but a worker can walk in the autoclave without any problem, when a foothold, a step or the like corresponding to the inclination is prepared. Further, though the inclination is gentle at the lowermost portion of the autoclave, the lowermost portion is a place where a leached residue stays most easily even if slurry is discharged in order for a worker to enter the autoclave, so that a desirable working situation can be rather created by preparing the measure.

EXAMPLES

Example 1

An operation was performed in a situation where the pressure in the autoclave apparatus was 4.7 MPaG, the temperature was 250 degrees C., the Ni grade in ore was 1.0 to 1.4% by weight, and the slurry inflow amount to an autoclave was about 300 to 700 m³/hr.

In this operation, an HPAL operation was performed by using the autoclave apparatus 100 to which the present invention was applied.

As a result, the leaching rate of nickel was 92.5%. At this time, it was possible to perform the operation while performing such a management that the free sulfuric acid concentration in the leachate was 45 to 50 g/L.

Comparative Example 1

An operation was performed in the same manner as Example 1 without applying the present invention except that an HPAL operation was performed by using an autoclave apparatus having the conventional structure where the respective partition walls 10A, 10B ... 10F in the autoclave main body 110 were replaced with ones having a distance C=0 from the center line of the autoclave main body 110.

As a result, the leaching rate of nickel was 92.0%. At this time, the operation was impossible unless management was performed such that the free sulfuric acid in the leachate was 50 to 55 g/L.

TABLE 1

|  | Example 1 | Comparative Example 1 |
|---|---|---|
| Autoclave pressure (MPaG) | 4.0 | 4.0 |
| Autoclave temperature (degrees C.) | 250 | 250 |
| Ore Ni grade (% by weight) | 1.0-4.01 | 0-1.4 |
| Slurry inflow amount (m³/hr) | 300-700 | 300-700 |
| Free sulfuric acid concentration (g/L) | 45-50 | 50-55 |
| Ni leaching rate (%) | 92.5 | 92.0 |

Example 2

An operation was performed in an overflow state in the autoclave apparatus 100 having a diameter of 6 m and an entire length of 40 m, which was partitioned into 7 vessels by partition walls 10A, 10B ... 10F, where the liquid flow ports for slurry transfer 52A, 52B ... 52F were installed at positions having heights of 100 cm from the lowermost portions of the respective partition walls 10A, 10B ... 1 0F and spaced from the centers of the partition walls toward the downstream side of a stirring blade rotation by 50 cm.

As a result, the leaching rate of nickel was 92.0%, which was a good result.

Comparative Example 2

An operation was performed in the same manner as Example 2 except that the liquid flow port for slurry transfer was installed at a position spaced toward the upstream side of a rotation direction of a stirring blade (a clockwise direction as viewed from the above) by 50 cm.

As a result, a short path of sulfuric acid from the first vessel to the second vessel occurred and much ore with insufficient leaching went out to the second vessel from the liquid flow port for slurry transfer, which resulted in reduction of the leaching rate.

REFERENCE SIGNS LIST 1A, 1B ... material slurry supply pipe,
2A, 2B ... sulfuric acid supply pipe,
3 ... high-pressure steam supply pipe,
4 ... sulfuric acid supply pipe,
5 ... PSV vent pipe
6 ... TAIL gas vent pipe,
7 ... slurry extraction pipe,
8 ... spare pipe,
10A, 10B ... 10F ... partition wall,
11C ... adjusting sheathing board,
12A, 12B ... 12F ... notch portion,
20A, 20B ... 20G ... compartment,
30A, 30B ... 30G ... stirrer,
41, 42, 43 ... manhole,
50A, 50B ... 50F ... opening for a manway,
51A, 51B ... 51F ... door,
52A, 52B ... 52F ... liquid flow port for slurry transfer
100 ... autoclave apparatus,
110 ... autoclave main body

The invention claimed is:

1. An autoclave apparatus used during a high-pressure acid leaching process, the autoclave apparatus comprising:
a cylindrical main body partitioned into a plurality of compartments by partition walls;
stirrers provided in the respective compartments for transferring slurry from an upstream side compartment to a downstream side compartment to sequentially advance leaching;
opening portions for a manway provided in bottom portions of each of the respective partition walls such that the opening portions do not reach end portions of the partition walls; and
rectangular liquid flow ports for slurry transfer provided on manway doors of the respective opening portions, each liquid flow port having a liquid flow port door for opening or closing the liquid flow port,
wherein the liquid flow ports are installed at positions where the heights from the lowermost portion of the autoclave to the center of gravity of the liquid flow port doors are 0.1 times to 0.3 times an autoclave diameter and distances from the longitudinal center lines of the partition walls to the center of gravity of the liquid flow port doors are 0.05 times to 0.25 times the autoclave diameter.

2. The autoclave apparatus according to claim 1, wherein the liquid flow ports are provided on the manway doors at positions on the downstream side in the stirring direction of the slurry caused by the stirrer in the upstream side compartment.

3. The autoclave apparatus according to claim 1, wherein the liquid flow ports for slurry transfer are rectangular openings with 30 cm square to 50 cm square.

* * * * *